(12) United States Patent
Wang et al.

(10) Patent No.: US 10,579,248 B2
(45) Date of Patent: Mar. 3, 2020

(54) METHOD AND DEVICE FOR DISPLAYING IMAGE BY USING SCROLL BAR

(71) Applicant: SAMSUNG ELECTRONICS CO., LTD., Suwon-si (KR)

(72) Inventors: Huaxing Wang, Tianjin (CN); Pengfei Li, Tianjin (CN); Shuang Li, Tianjin (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 519 days.

(21) Appl. No.: 14/923,984

(22) Filed: Oct. 27, 2015

(65) Prior Publication Data

US 2016/0117092 A1    Apr. 28, 2016

(30) Foreign Application Priority Data

Oct. 27, 2014  (CN) .......................... 2014 1 0581822
Sep. 22, 2015  (KR) ........................ 10-2015-0133875

(51) Int. Cl.
*G06F 3/0485* (2013.01)
*G06F 3/0482* (2013.01)

(52) U.S. Cl.
CPC ........ *G06F 3/04855* (2013.01); *G06F 3/0482* (2013.01); *G06F 2203/04803* (2013.01)

(58) Field of Classification Search
CPC ............... G06F 3/04855; G06F 3/0482; G06F 2203/04803
See application file for complete search history.

(56) References Cited

U.S. PATENT DOCUMENTS

| | | | |
|---|---|---|---|
| 7,159,188 B2 | 1/2007 | Stabb et al. | |
| 8,578,261 B1* | 11/2013 | Gupta | G06F 16/957 715/208 |
| 8,762,844 B2 | 6/2014 | Kim et al. | |
| 2002/0186252 A1* | 12/2002 | Himmel | G06F 3/04855 715/787 |
| 2005/0091612 A1* | 4/2005 | Stabb | G06F 3/0481 715/816 |
| 2010/0146012 A1* | 6/2010 | Beaudreau | G06F 16/3326 707/803 |
| 2012/0131497 A1* | 5/2012 | Jitkoff | G06F 3/0481 715/786 |

FOREIGN PATENT DOCUMENTS

CN          101849409 A    9/2010

* cited by examiner

*Primary Examiner* — Ajay M Bhatia
*Assistant Examiner* — Mong-Shune Chung
(74) *Attorney, Agent, or Firm* — Sughrue Mion, PLLC

(57) ABSTRACT

Provided is a device including a display unit configured to display a main window for displaying an image on a screen of the device, and to display, on the main window, a user interface for receiving an input for selecting an area of the image to be displayed on the main window and a first partial image selected via the user interface, a user input unit configured to receive a user input for selecting a point on the user interface; and a controller configured to control, when the user input for selecting the point on the user interface is received, the display unit to display a sub-window on the main window on which the first partial image is displayed, wherein the sub-window displays a second partial image of the image which corresponds to the selected point on the user interface.

17 Claims, 11 Drawing Sheets

(a)  (b)

(a)  (b)

METHOD AND DEVICE FOR DISPLAYING IMAGE BY USING SCROLL BAR

CROSS-REFERENCE TO RELATED APPLICATION

This application claims the benefit of Chinese Patent Application No. 201410581822.3, filed on Oct. 27, 2014, in the State Intellectual Property Office of P.R.C., and Korean Patent Application No. 10-2015-0133875, filed on Sep. 22, 2015, in the Korean Intellectual Property Office, the disclosures of which are incorporated herein in their entireties by reference.

BACKGROUND

Field

The present disclosure relates to methods and devices for displaying a preview of an image by using a scroll bar.

Description of the Related Art

Recently, services and additional functions that may be provided by devices have become more varied. In order to improve user experience, various functions and modules are combined in devices.

In order to satisfy user demand, screen sizes of current devices have increased, so that current devices may display more items of content in one image. However, even if screens are large, a user cannot maintain a high quality visual experience when items of content are integrally displayed in one image.

For items of content that cannot be integrally displayed in a screen, existing devices use a method of paging display. Thus, the user may turn pages by operating a scroll bar or by sliding the screen.

Although the user slides the screen so as to turn the pages, the user himself/herself needs to continuously slide the screen so as to search for user-desired content. Moreover, while the user slides the screen so as to directly enter another menu, the user may click irrelevant content by mistake, such that efficiency of searching for user-desired content may be very low.

SUMMARY

Provided are methods and devices for displaying a preview of an area of an image which is not displayed on a screen, without scrolling the image displayed on the screen.

Additional aspects will be set forth in part in the description which follows and, in part, will be apparent from the description, or may be learned by practice of the presented exemplary embodiments.

According to an aspect of an exemplary embodiment, a device includes a display unit configured to display a main window for displaying an image on a screen of the device, and to display, on the main window, a user interface for receiving an input for selecting an area of the image to be displayed on the main window and a first partial image selected via the user interface, a user input unit configured to receive a user input for selecting a point on the user interface; and a controller configured to control, when the user input for selecting the point on the user interface is received, the display unit to display a sub-window on the main window on which the first partial image is displayed, wherein the sub-window displays a second partial image of the image which corresponds to the selected point on the user interface.

When the user input for selecting the point on the user interface is not received while the sub-window is displayed, the controller may be further configured to control the display unit not to display the sub-window.

The user input unit may be further configured to receive a user input for fixing the sub-window to the main window, and the controller may be further configured to control, when the user input for fixing the sub-window to the main window is received, the display unit to continuously display the second partial image that is displayed on the sub-window when the user input for fixing the sub-window to the main window is received.

The user input unit may be further configured to receive a user input for selecting the sub-window; and the controller may be further configured to control, when the sub-window is selected, the display unit to delete the sub-window and then to display the second partial image on the main window, wherein the second partial image has been displayed on the sub-window.

The second partial image may include a user interface object, the user input unit may be further configured to receive a user input for selecting the user interface object on the sub-window, and the controller may be further configured to execute a function corresponding to the user interface object, according to the user interface object.

The user input unit may be further configured to receive a user input for changing the sub-window to the main window, and the controller may be further configured to control, when the user input for changing the sub-window to the main window is received, the display unit to change the main window to a first main window, to change the sub-window to a second main window, and then to display both the first main window and the second main window.

The display unit may be further configured to display a marker, which indicates the selected point, on the selected point.

The user input for selecting the point on the user interface may include at least one of a proximate touch input and a mouse-over input.

The user interface may include a slider for indicating, in the image, a position of the first partial image, the user input unit may be further configured to receive a second user input for selecting the slider and moving the slider on the user interface, and the controller may be further configured to control, when the slider is moved on the user interface, the display unit to change the area of the image which is displayed on the main window.

The image may include at least one of an item list, a webpage, and an electronic document.

According to an aspect of another exemplary embodiment, a method of displaying an image includes displaying a main window for displaying an image on a screen of the device; displaying, on the main window, a user interface for receiving an input for selecting an area of the image to be displayed on the main window and a first partial image selected via the user interface; receiving a user input for selecting a point on the user interface; and when the user input for selecting the point on the user interface is received, displaying a sub-window on the main window on which the first partial image is displayed, wherein the sub-window displays a second partial image of the image which corresponds to the selected point on the user interface.

The method may further include not displaying of the sub-window, when the user input for selecting the point on the user interface is not received while the sub-window is displayed.

The method may further include receiving a user input for fixing the sub-window to the main window; and when the user input for fixing the sub-window to the main window is received, continuously displaying the second partial image that is displayed on the sub-window when the user input for fixing the sub-window to the main window is received.

The method may further include receiving a user input for selecting the sub-window; and when the sub-window is selected, deleting the sub-window and then displaying the second partial image on the main window, wherein the second partial image has been displayed on the sub-window.

The second partial image may include a user interface object, and the method may further include receiving a user input for selecting the user interface object on the sub-window; and executing a function corresponding to the user interface object, according to the user interface object.

The method may further include receiving a user input for changing the sub-window to the main window; and when the user input for changing the sub-window to the main window is received, changing the main window to a first main window, changing the sub-window to a second main window, and then displaying both the first main window and the second main window.

The method may further include displaying a marker, which indicates the selected point, on the selected point.

The user input for selecting the point on the user interface may include at least one of a proximate touch input and a mouse-over input.

The user interface may include a slider for indicating, in the image, a position of the first partial image, and the method may further include receiving a second user input for selecting the slider and moving the slider on the user interface; and when the slider is moved on the user interface, changing the area of the image which is displayed on the main window.

The image may include at least one of an item list, a webpage, and an electronic document.

According to an aspect of another exemplary embodiment, a non-transitory computer-readable recording medium includes a recorded program for executing the method.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings. In the following description, well-known functions or constructions are not described in detail since they would obscure exemplary embodiments with unnecessary detail.

As used herein, the term "and/or" includes any and all combinations of one or more of the associated listed items. Expressions such as "at least one of," when preceding a list of elements, modify the entire list of elements and do not modify the individual elements of the list.

When a suspension event occurs on a scroll bar, a device according to one or more exemplary embodiments of the present disclosure may provide a content preview function so as to display, via a sub-window, content information at a position corresponding to a suspension input point. Here, the scroll bar may be displayed at a right or lower side of an image on the device or may be hidden at the right or lower side. That is, one or more exemplary embodiments of the present disclosure may be applied to at least one case in which the scroll bar is displayed, is hidden, or is omitted. In one or more exemplary embodiments, for convenience of description, it is assumed that the scroll bar is always displayed.

Furthermore, the device according to one or more exemplary embodiments of the present disclosure may include electronic devices such as a mobile phone, a smartphone, a panel computer, a multimedia player, a portable computer, a personal digital assistant (PDA), or the like.

Figure 1:
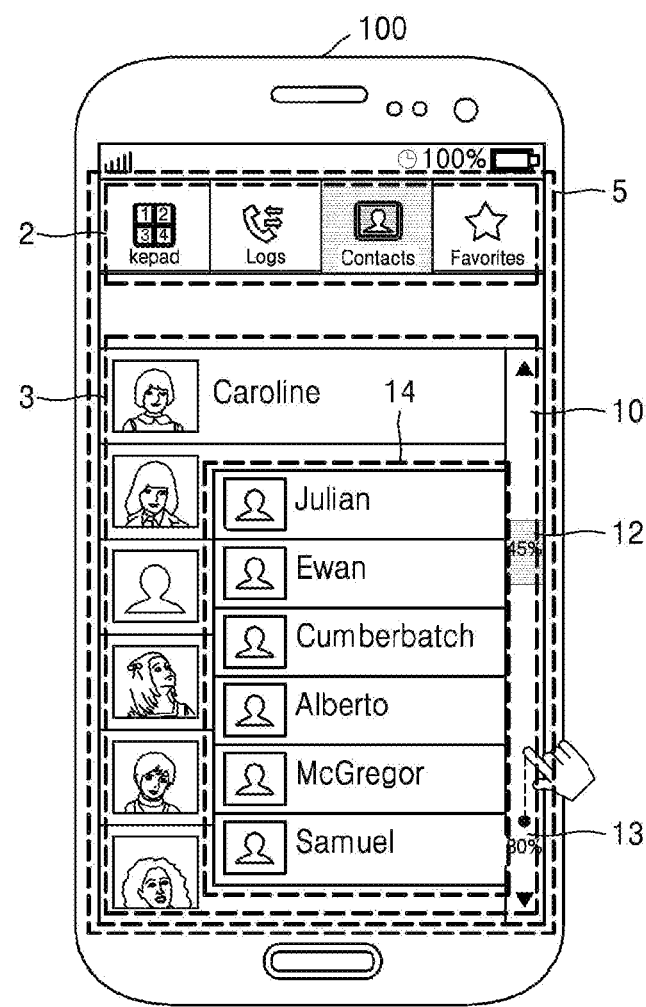
FIG. 1 is a diagram illustrating a method of providing a content preview function, the method being performed by a device, according to an exemplary embodiment.

FIG. 1 is a diagram illustrating a method of providing a content preview function, the method being performed by a device 100, according to an exemplary embodiment.

Referring to FIG. 1, the device 100 may provide the content preview function.

For example, the device 100 may display a main window 5 for displaying an image on a screen of the device 100. The image may include, but is not limited to, at least one of an item list, a webpage, and an electronic document.

The main window 5 may be divided into an image display area 3 and a menu area 2. When a size of an image to be displayed on the main window 5 is greater than a size of the image display area 3 on the main window 5, a scroll bar 10 for receiving selection of an area to be displayed on the main window 5, and a first partial image selected by using the scroll bar 10 may be displayed on the image display area 3 in the main window 5.

An image size may correspond to the number of required pixels in a screen so as to display an entire portion of an image. When a user input for enlarging a letter or the image is received, the image size may become greater than the size of the image display area 3, and when a user input for reducing the letter or the image is received, the image size may become smaller than the size of the image display area 3.

Referring to FIG. 1, the image may indicate a plurality of vertically-arranged contacts that are stored in the device 100, and the first partial image may indicate some contacts from among the plurality of contacts. Throughout the specification, a partial image of an image may be referred to as a view.

The scroll bar 10 may include a slider 12 for selecting the first partial image. A length of the scroll bar 10 may correspond to an entire length of the image, and the device 100 may determine the first partial image so as to allow a position of the slider 12 on the scroll bar 10 to correspond to a position of the first partial image on the entire portion of the image.

For example, when a user input for selecting the slider 12 and then moving the selected slider 12 on the scroll bar 10 is received, an area of the image to be displayed on the main window 5 may be changed. For example, when a user input for moving down the slider 12 is received, contacts positioned below other contacts that are currently displayed on the main window 5 may be sequentially displayed, wherein the other contacts are from among the plurality of contacts in the image.

The device 100 may receive a user input for selecting a first point 13 on the scroll bar 10. The user input for selecting the first point 13 on the scroll bar 10 may be, but is not limited to, a proximate touch input or a mouse-over input. The proximate touch input may indicate an input for selecting a point or an area in a screen by positioning a finger or a touch pen near the screen with a preset distance (e.g., 0.5 cm) therebetween, without directly touching the screen. The mouse-over input may indicate an input for selecting, by moving a mouse arranged at the device 100, a point or an area in a screen by positioning a cursor of the mouse at a particular point of the screen.

Throughout the specification, the user input for selecting the first point 13 on the scroll bar 10 may be referred to as a floating input and the first point 13 on the scroll bar 10 may be referred to as a suspension input point 13. When the user input for selecting the first point 13 on the scroll bar 10 is received, the device 100 may determine that the suspension event has occurred. Throughout the specification, the point selected via the proximate touch input or the mouse-over input may be referred to as a suspension input point.

When the user input for selecting the first point 13 on the scroll bar 10 is received, the device 100 may determine a second partial image corresponding to the selected first point 13, and may display a sub-window 14 indicating the second partial image on the main window 5 whereon the first partial image is displayed. In this case, the device 100 may determine the second partial image, so that a position of the first point 13 on the scroll bar 10 may correspond to a position of the second partial image on the entire portion of the image. Accordingly, the second partial image may correspond to a partial image to be displayed on the main window 5, when the slider 12 is positioned at the first point 13.

Also, the device 100 may display, on the slider 12, a ratio of a length between a start point of the scroll bar 10 and a position of the slider 12 to an overall length of the scroll bar 10, and may display, on the first point 13, a ratio of a length between the start point of the scroll bar 10 and the first point 13 to the overall length of the scroll bar 10.

Throughout the specification, a first partial image may be referred to as a current view, and a second partial image may be referred to as a target view. According to embodiments, the sub-window 14 may be referred to as a pop-up window.

When a user input for changing a position of a proximate touch on the scroll bar 10 is received, the device 100 may change the second partial image corresponding to the position of the proximate touch, and may display a changed second partial image on the sub-window 14. Also, when a user input for changing the position of the proximate touch is received, the device 100 may change a position of the sub-window 14 according to a changed position of the proximate touch.

Therefore, even if a user does not search for a contact by using the slider 12, the user may preview a search-target contact by using a proximate touch.

Figure 2:
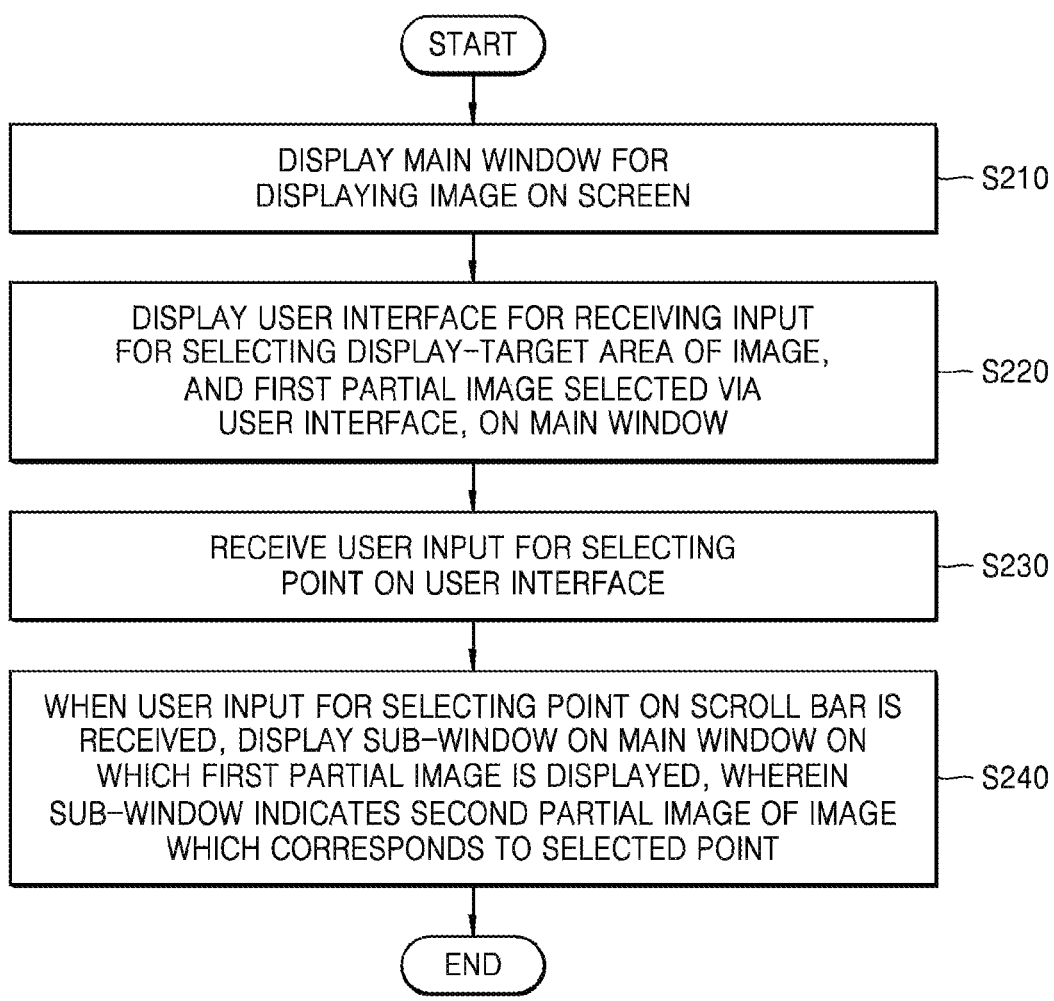
FIG. 2 is a flowchart illustrating a method of providing a content preview function, the method being performed by the device, according to an exemplary embodiment.

FIG. 2 is a flowchart illustrating a method of providing a content preview function, the method being performed by the device 100, according to an exemplary embodiment.

In operation S210, the device 100 may display a main window for displaying an image on a screen of the device 100.

A size of the main window may be equal to a size of the screen of the device 100 or may be less than the size of the screen of the device 100. The device 100 may display only information on the main window, or may display information and a menu for selecting display-target information.

An image may indicate a page whose all areas are displayed via scrolling, without switching a screen. The image may be generated in a manner that an image file is rendered, or may be generated in a manner that a plurality of pieces of information are arranged in one page according to a preset order or positions. For example, the image may be, but is not limited to, an item list, a webpage, a rendered image of an electronic document, or a rendered image of an image file.

In operation S220, the device 100 may display a user interface for receiving an input for selecting a display-target area of the image, and a first partial image selected via the user interface, on the main window.

The device 100 may determine whether all areas of the image cannot be displayed at one time on the screen due to that a size of the image is greater than a size of the main window, and if all areas of the image cannot be displayed at one time on the screen, the device 100 may display the user interface for receiving an input for selecting an area of the image which is to be displayed on the main window.

The user interface may include a scroll bar and is not limited thereto.

The scroll bar may include a slider for selecting the first partial image to be displayed on the main window. The device 100 may determine, based on a position of the slider, the first partial image of the image which is to be displayed on the main window. For example, the device 100 may determine the first partial image, so that the position of the slider on the scroll bar may correspond to a position of the first partial image in an entire portion of the image.

For example, referring to FIG. 1, the device 100 may determine a ratio of a length between a top end of the scroll bar 10 and a current position of the slider 12 to a length of the scroll bar 10, and may determine the first partial image so as to allow a ratio of a distance between a top end of the image and the first partial image to a vertical length of the image to correspond to the determined ratio.

When the device 100 receives a user input for moving the slider, the device 100 may change an area of an image which is displayed on the main window, or when the device 100 receives a user input for swiping or flicking the screen, the device 100 may change the area of the image which is displayed on the main window. When the area of the image displayed on the main window is changed, the device 100 may determine the position of the slider, so that a position of the area (the first partial image) of the image which is displayed on the main window and is with respect to a length of the image may correspond to a position of the slider with respect to the length of the scroll bar.

In operation S230, the device 100 may receive a user input for selecting a point on the user interface.

For example, the device 100 may receive a user input for selecting a point on the scroll bar. The user input for selecting the point on the scroll bar may include, but is not limited to, a proximate touch input or a mouse-over input.

In operation S240, when the device 100 receives the user input for selecting the point on the scroll bar, the device 100 may display a sub-window on the main window on which the first partial image is displayed, wherein the sub-window indicates a second partial image of the image which corresponds to the selected point.

When the device 100 receives the user input for selecting the point on the scroll bar, the device 100 may determine the second partial image of the image which corresponds to the selected point. For example, the device 100 may determine the second partial image, so that a ratio of a length between a start point of the scroll bar and the selected point to the length of the scroll bar may correspond to a ratio of a length between a start point of the image and the second partial image to the length of the image.

When the slider is positioned at the selected point, the second partial image may be the same as an area to be displayed on the main window, and a size of the second partial image may be less or greater than the area.

When the second partial image is determined, the device 100 may display the sub-window indicating the second partial image on the main window.

Furthermore, the device 100 may display a marker indicating the selected point on the selected point.

Furthermore, while the sub-window is displayed according to a proximate touch, when the proximate touch is no longer received, the device 100 may delete the sub-window. Also, after the proximate touch is not received, when a preset time period elapses, the device 100 may delete the sub-window.

Furthermore, the device 100 may fix the second partial image on the main window. For example, when the device 100 receives a user input for fixing the sub-window to the main window, even if the proximate touch is not received or a position of the proximate touch is changed, the device 100 may continuously display the second partial image that is displayed on the sub-window when the user input for fixing the sub-window to the main window is received.

Furthermore, the device 100 may display, on the main window, the second partial image that is displayed on the sub-window. For example, when a user input for selecting the sub-window is received, the device 100 may delete the sub-window and may display, on the main window, the second partial image that has been displayed on the sub-window.

Furthermore, when the second partial image includes a user interface object, the device 100 may receive a user input for selecting the user interface object via the sub-window, and may execute a function corresponding to the user interface object. For example, when the second partial image includes a moving picture player and the device 100 receives a user input for selecting a button to start the moving picture player on the sub-window, the device 100 may reproduce a moving picture on the sub-window.

Furthermore, the device 100 may change the sub-window to another main window different from the main window that is displayed on the screen. For example, when the device 100 receives a user input for changing a sub window to a main window, the device 100 may change the main window as a first main window, may change the sub-window as a second main window, and may display both the first main window and the second main window.

Figure 3:
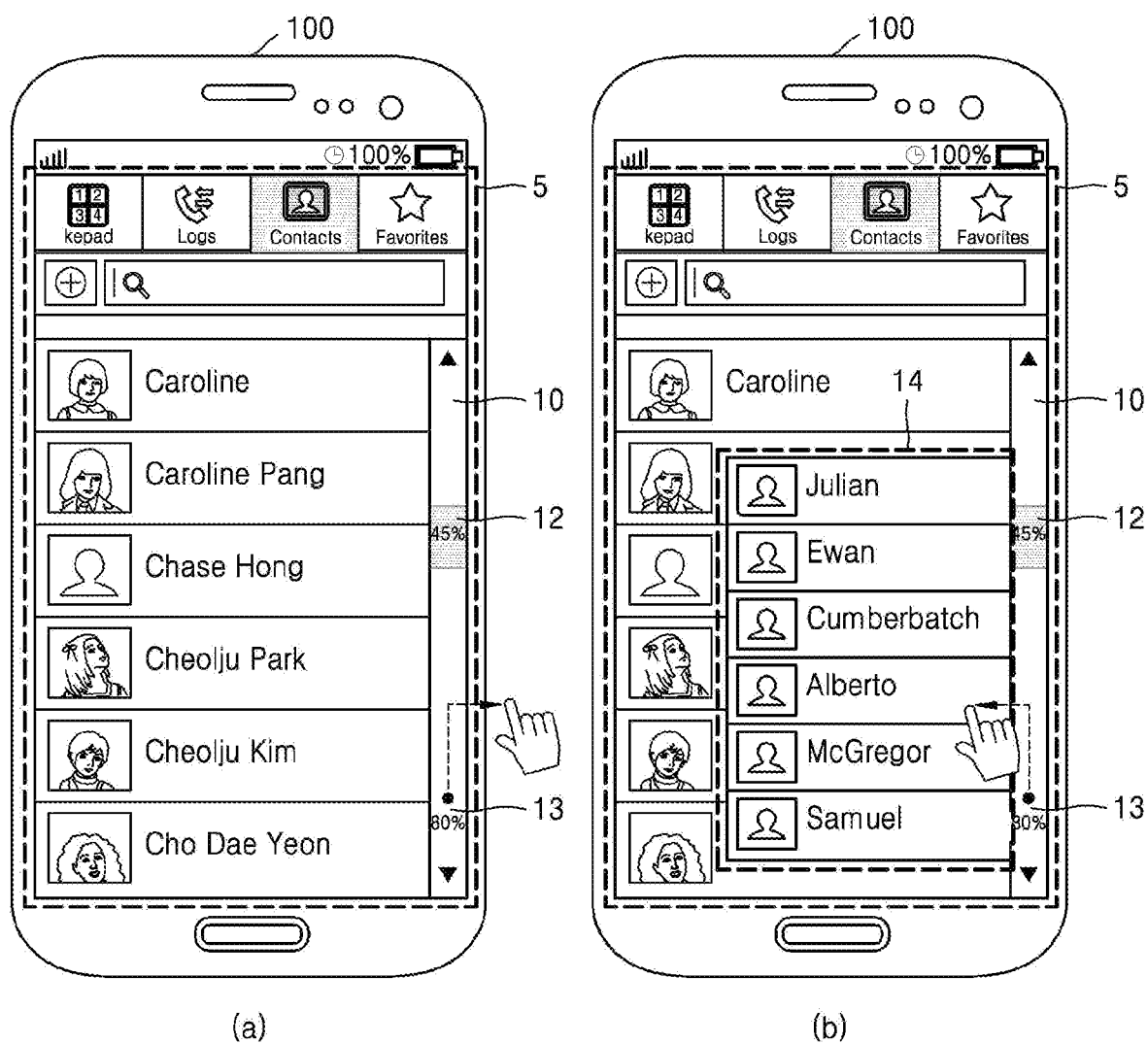
FIG. 3 illustrates a method of fixing a sub-window to a screen or deleting the sub-window according to a user input, the method being performed by the device, according to an exemplary embodiment.

FIG. 3 illustrates a method of fixing the sub-window 14 to a screen or deleting the sub-window 14 according to a user input, the method being performed by the device 100, according to an exemplary embodiment.

Referring to (a) of FIG. 3, the device 100 may delete the sub-window 14.

For example, after a proximate touch or a position of a cursor on the scroll bar 10 deviates from a region of the scroll bar 10, when a preset time period elapses, the device 100 may delete the sub-window 14.

As another example, when the device 100 receives a preset user input, the device 100 may delete the sub-window 14. For example, when the device 100 receives a user input for moving a proximate touch from a selected point 13 on the scroll bar 10 toward an opposite direction of the sub-window 14, the device 100 may delete the sub-window 14.

Referring to (b) of FIG. 3, the device 100 may fix the sub-window 14 to the screen, based on a user input.

The user input for fixing the sub-window 14 to the screen may be, but is not limited to, a user input for moving a proximate touch from the selected point 13 on the scroll bar 10 toward the sub-window 14 or a user input for touching or clicking the sub-window 14. The device 100 may display a user interface object (e.g., a button) to fix the sub-window 14 to the scroll bar 10, the sub-window 14 or the main window 5, and may receive a user input for selecting the displayed user interface object.

When the sub-window 14 is fixed to the screen, even if the device 100 does not receive a proximate touch input or a mouse-over input or a proximate touch point or a mouse-over point is changed, the device 100 may continuously display a second partial image that is displayed when the sub-window 14 is fixed to the screen.

Since the sub-window 14 is fixed to the screen, the device 100 may select an object displayed on the sub-window 14. When the object displayed on the sub-window 14 is selected, the device 100 may execute a function corresponding to the selected object. In this case, the device 100 may execute the function corresponding to the selected object on the sub-window 14, or may delete the sub-window 14 and then may execute the function on the main window 5.

For example, while the sub-window 14 is fixed to the main window 5, when the device 100 receives a user input for selecting one of contacts displayed on the sub-window 14, the device 100 may display detail information about the selected contact on the sub-window 14.

Alternatively, while the sub-window 14 is fixed to the main window 5, when the device 100 receives a user input for selecting one of contacts displayed on the sub-window 14, the device 100 may delete the sub-window 14 and may display detail information about the selected contact on the main window 5.

While the sub-window 14 is fixed to the main window 5, the device 100 may receive a user input for deleting the sub-window 14. For example, while the sub-window 14 is fixed to the main window 5, when the device 100 receives a user input for touching or clicking an area on which the sub-window 14 is not displayed and that is from among areas of the main window 5, the device 100 may delete the sub-window 14.

Figure 4:
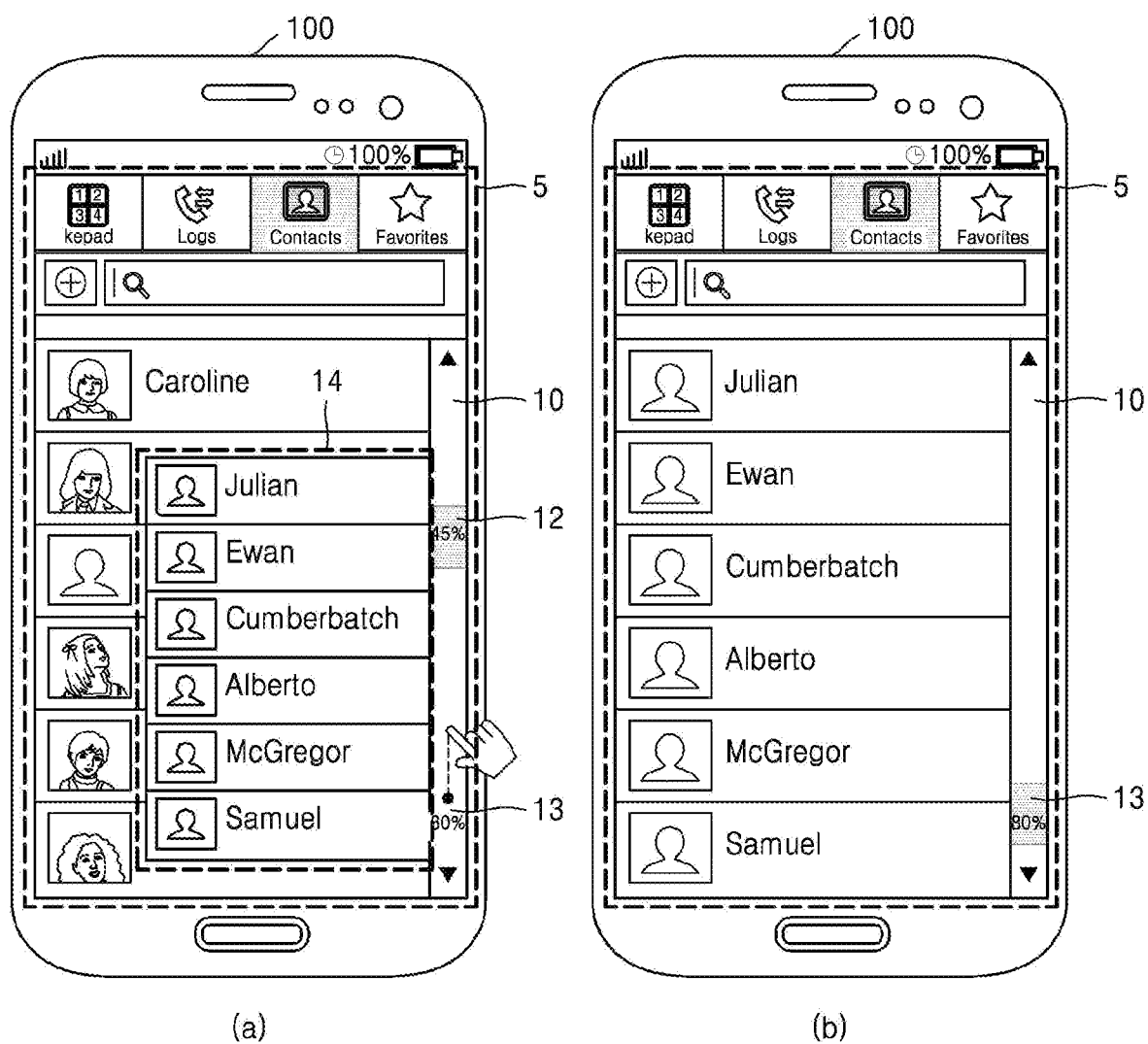
FIG. 4 illustrates a method of switching information displayed on the sub-window to a main window, the method being performed by the device, according to an exemplary embodiment.

FIG. 4 illustrates a method of switching information displayed on the sub-window 14 to the main window 5, the method being performed by the device 100, according to an exemplary embodiment.

Referring to (a) of FIG. 4, the device 100 may receive a user input for selecting the sub-window 14. The user input for selecting the sub-window 14 may be an input for directly touching a selected point 13 or clicking the selected point 13. Also, the user input for selecting the sub-window 14 may be an input for directly touching the sub-window 14 or clicking the sub-window 14.

The device 100 may display a user interface object (e.g., a button) to select the sub-window 14 on the scroll bar 10, the sub-window 14 or the main window 5, and may receive a user input for selecting the displayed user interface object.

Referring to (b) of FIG. 4, when the device 100 receives a user input for selecting the sub-window 14, the device 100 may delete the sub-window 14 and may display, on the main window 5, information that has been displayed on the sub-window 14. Also, the device 100 may move the slider 12 on the scroll bar 10 to the selected point 13.

In an exemplary embodiment, when the device 100 receives a user input for selecting the sub-window 14, the device 100 may display, on the main window 5, a second partial image that has been displayed on the sub-window 14, and may display, on the sub-window 14, a first partial image that has been displayed on the main window 5.

Figure 5:
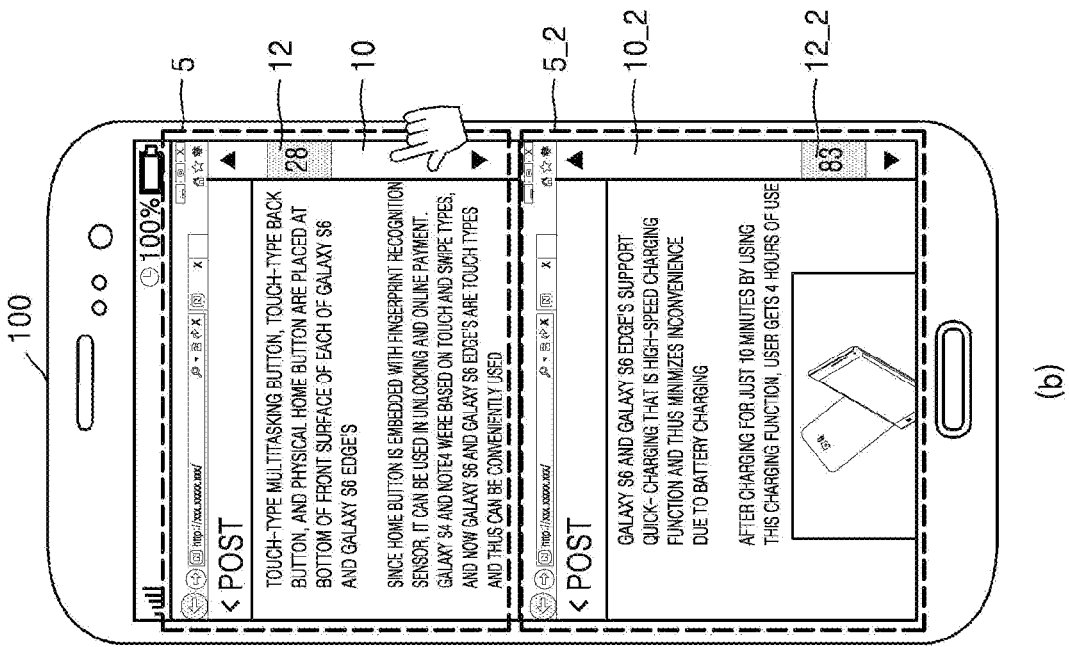
FIG. 5 illustrates a method of changing the sub-window to a separate main window, the method being performed by the device, according to an exemplary embodiment.
Figure 5:
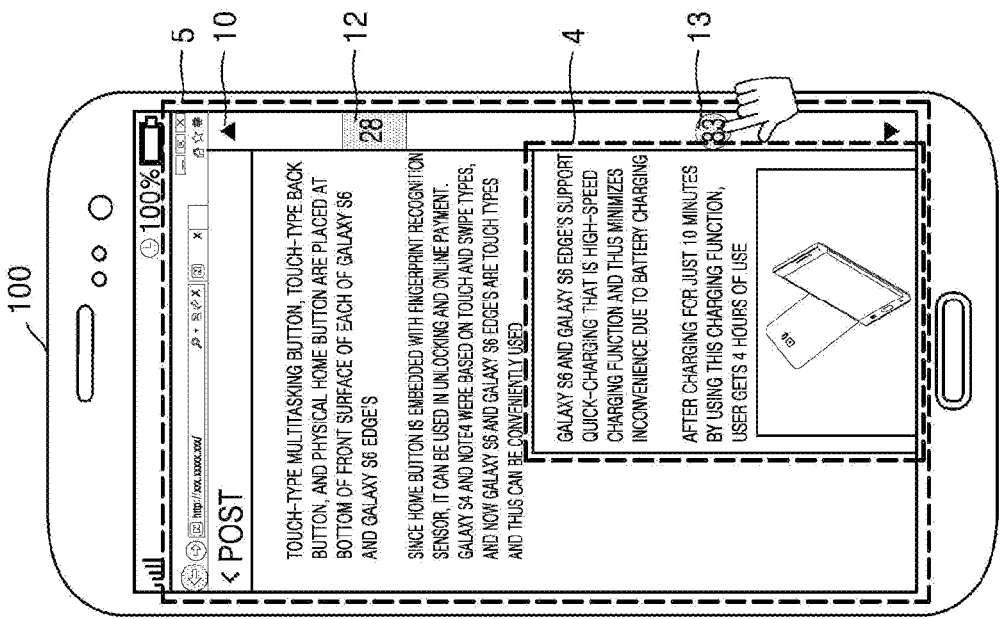

FIG. 5 illustrates a method of changing the sub-window 14 to a separate main window, the method being performed by the device 100, according to an exemplary embodiment.

Referring to (a) of FIG. 5, the device 100 may display a webpage. In this regard, when all information in the webpage cannot be displayed at one time on the main window 5, the device 100 may display a first partial image that is a partial area of the webpage and the scroll bar 10 on the main window 5. Also, when the device 100 may display, on the main window 5, a slider 12 indicating a position of the first partial image in the webpage.

When the device 100 receives a user input for proximately touching a point 13 on the scroll bar 10, the device 100 may determine a second partial image so that a selected position of the point 13 on the scroll bar 10 may correspond to a position of the second partial image in an entire page. The device 100 may display the determined second partial image on the sub-window 14.

Referring to (b) of FIG. 5, when the device 100 receives a user input for changing the sub-window 14 to a main window, the device 100 may change the sub-window 14 to the main window and may display the second partial image.

The user input for changing the sub-window 14 to the main window may correspond to an input of a proximate touch that maintains on the selected point 13 for a preset time period. Also, the user input for changing the sub-window 14 to the main window may correspond to an input for directly touching the selected point 13 or clicking the selected point 13. Also, the user input for changing the sub-window 14 to the main window may correspond to an input for directly touching the sub-window 14 or clicking the sub-window 14.

The device 100 may display a user interface object (e.g., a button) to change the sub-window 14 on the scroll bar 10, the sub-window 14 or the main window 5 to the main window, and may receive a user input for selecting the displayed user interface object.

When the device 100 receives the user input for changing the sub-window 14 to the main window, the device 100 may change the main window 5, which is previously displayed, to a first main window 5, and may change the sub-window 14 to a second main window 5_2.

The device 100 may decrease a size of the previously-displayed main window 5, and may change the sub-window 14 to the second main window 5_2 that includes a second scroll bar 10_2. In this case, when a point selected on the scroll bar 10 in the previously-displayed main window 5 corresponds to a position at 83% of an overall length of the scroll bar 10, the device 100 may display a second slider 12_2 in the second main window 5_2 so that a position of the second slider 12_2 may be a position at 83% of the second scroll bar 10_2. The device 100 may display both the main window 5 and the second main window 5_2 at one time.

In this regard, as illustrated in FIG. 5, the device 100 may display a first partial image on the main window 5 and may display a second partial image on the second main window 5_2.

Figure 6:
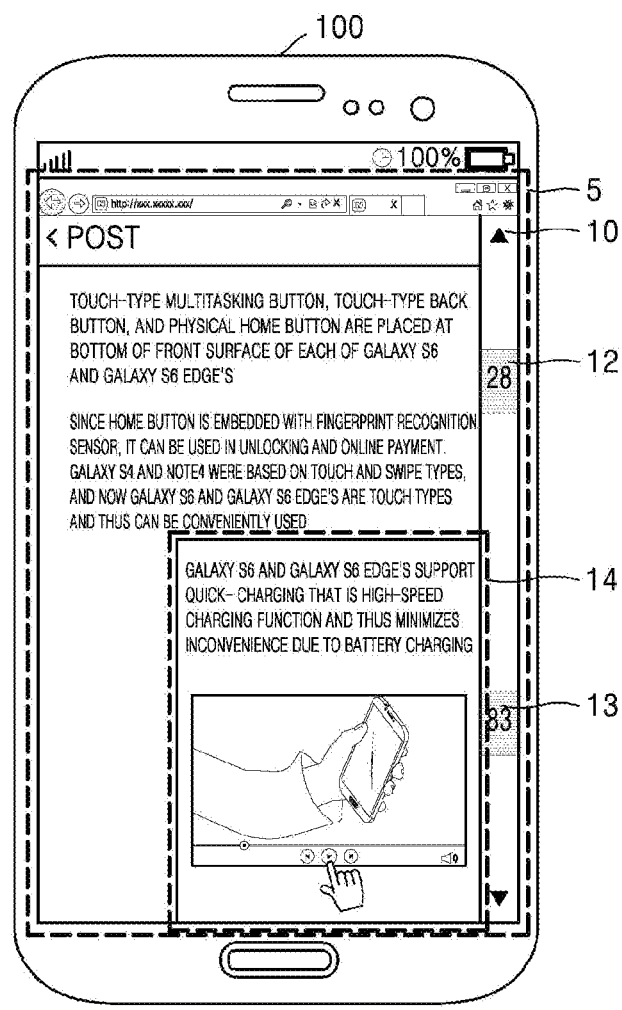
FIG. 6 illustrates a method of executing a function on the sub-window, the method being performed by the device, according to an exemplary embodiment.

FIG. 6 illustrates a method of executing a function on the sub-window 14, the method being performed by the device 100, according to an exemplary embodiment.

Referring to FIG. 6, the device 100 may execute a function on the sub-window 14.

For example, a first partial image of a webpage may be displayed on the main window 5, and a second partial image of the webpage may be displayed on the sub-window 14. In this case, the second partial image may include a moving picture player. Therefore, the moving picture player may be displayed on the sub-window 14. The moving picture player may include user interface objects such as a reproduce button, a pause button, a stop button, a volume control button, an image size control button, or the like.

When the device 100 receives a user input for selecting the user interface object on the moving picture player in the sub-window 14, the device 100 may execute a function corresponding to the user interface object, according to the selected user interface object. For example, when the device 100 receives a user input for selecting the reproduce button on the moving picture player, the device 100 may render a moving picture, and may display a rendered image on the sub-window 14.

Figure 7:
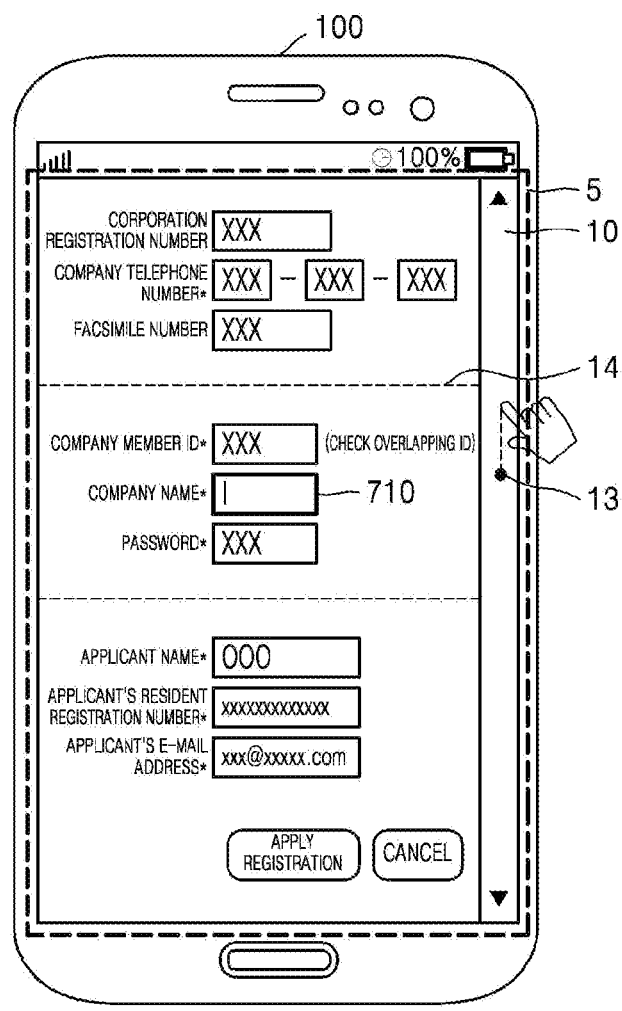
FIG. 7 illustrates a method of displaying a blank input field by using a content preview function, the method being performed by the device, according to an exemplary embodiment.

FIG. 7 illustrates a method of displaying a blank input field by using a content preview function, the method being performed by the device 100, according to an exemplary embodiment.

Referring to FIG. 7, while a page including input fields is displayed on the main window 5, the device 100 may display the sub-window 14 indicating the blank input field, according to a user input.

For example, in a member joining page including a plurality of input fields, a user may perform a proximate touch on the scroll bar 10 so as to search for a blank input field 710 or a falsely-input input field. When the device 100 receives a user input of the proximate touch on the scroll bar 10, the device 100 may display, on the sub-window 14, an input field that corresponds to a point of the proximate touch and is from among the plurality of input fields.

The device 100 may receive a user input for inputting a field value to the input field that is displayed on the sub-window 14.

For example, the device 100 may receive a user input for fixing the sub-window 14 to the main window 5, and may receive a user input for inputting the field value to the input field in the fixed sub-window 14 or may receive a user input for amending the field value. The device 100 may receive a user input for amending or inputting a field value to the input field while a user maintains a proximate touch on the scroll bar 10 by using his/her hand.

Figure 8:
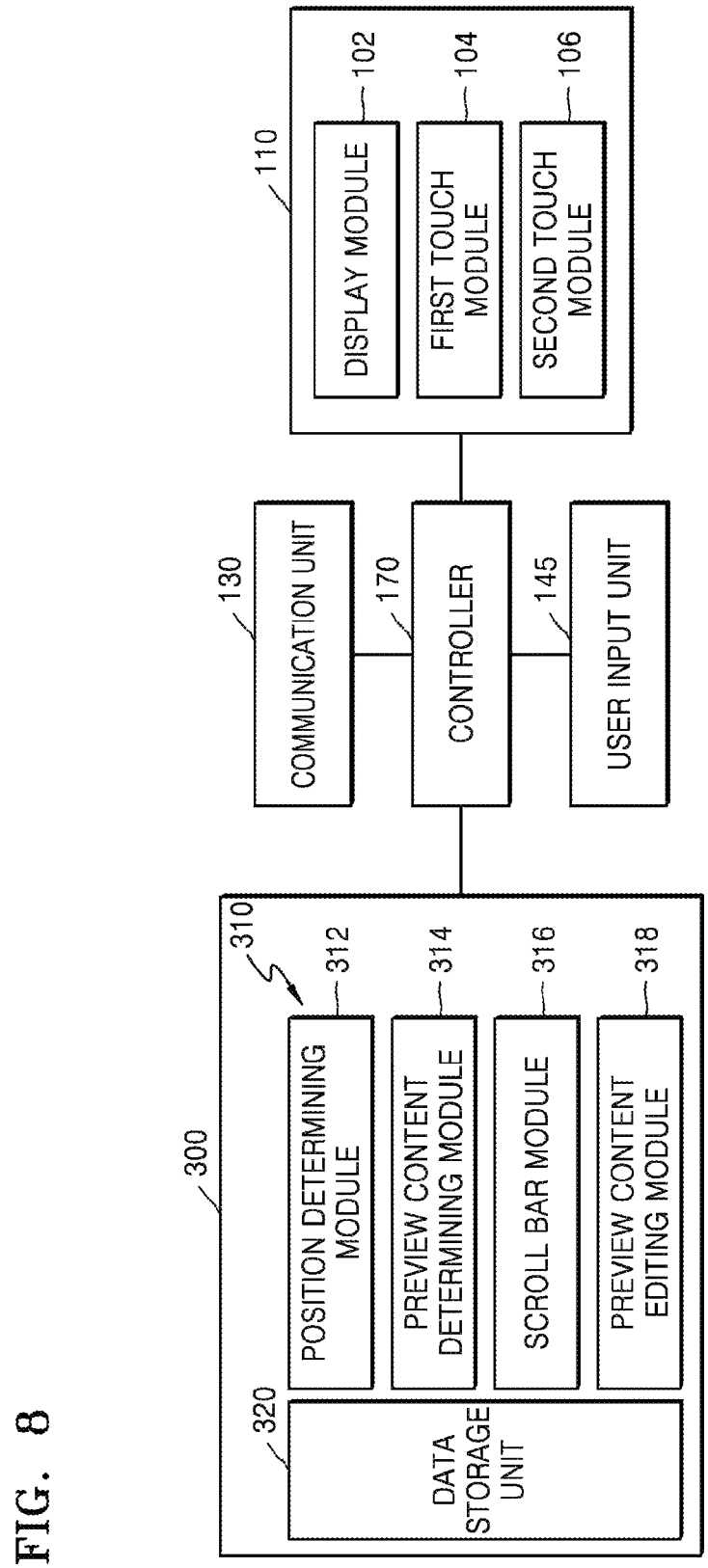
FIG. 8 is a block diagram illustrating the device that provides a content preview function, according to an exemplary embodiment.

FIG. 8 is a block diagram illustrating the device 100 that provides a content preview function, according to an exemplary embodiment.

As illustrated in FIG. 8, the device 100 may include a display unit 110, a user input unit 145, a storage 300, a communication unit 130, and a controller 170.

The display unit 110 may include a display module 102, and a plurality of touch modules (e.g., a first touch module 104 and a second touch module 106). The plurality of touch modules 104 and 106 may detect an input generated by using a contact or contactless method. The plurality of touch modules 104 and 106 may output different values, respectively. In the present exemplary embodiment, it is assumed that the device 100 has two touch modules, but one or more exemplary embodiments are not limited thereto and thus may be applied to a device including two or more modules.

The display module 102 may be used to display, on a screen of the device 100, a plurality of items of content such as status information, user input information, communication data, or the like. In this regard, the plurality of items of content may include a still image, a motion image, webpage information, a communication data list, a contact list, or the like. For example, the display module 102 may display preview content via a sub-window (or a floating window). Also, the display module 102 may display an interfacing procedure between a user and the device 100 via a sub-window.

The first touch module 104 is used to detect a touch motion of an input device with respect to the screen. For example, the first touch module 104 may receive an analog signal generated by the touch motion of the input device, may convert the analog signal to a digital signal (e.g., X, Y, and Z coordinates), and may transmit the digital signal to the controller 170. The first touch module 104 may receive analog information generated by sequential touches (e.g., sliding) of the input device, may convert the analog information to digital information, and may transmit the digital information to the controller 170.

The second touch module 106 may be used to detect a suspension motion of the input device. For example, the second touch module 106 may detect a suspension event of the input device, and when the suspension event (e.g., an event in which a height from a touch member of the input device to the screen is within a preset range) is generated, the second touch module 106 may receive an analog signal generated by the suspension event, may convert the analog signal to a digital signal, and may transmit the digital signal to the controller 170. Accordingly, a position of a suspension input point, a distance between the input device and the screen, or the like may be determined. For example, the second touch module 106 may use an electronic magnetic resonance (EMR), and the input device may include a touch stylus having an internal resonance circuit.

The controller 170 may guide a user's motion by controlling the display module 102 that displays an image (e.g., a pointer, a luminous point, etc.) of a preset suspension input effect with respect to the suspension event, according to the digital signal from the second touch module 106.

The user input unit 145 may provide, to the controller 170, input data generated by the input device using a contact or contactless (suspension) method. For example, the user input unit 145 may provide, to the controller 170, input data with respect to a main window and a sub-window which is generated by the input device, thus, the controller 170 may control the display module 102 to perform a corresponding display in an image. The input device may indicate a user's body (e.g., a finger) or a touch stylus that realizes a touch by a handwriting stylus.

The storage 300 may include a program storage unit 310 for storing a program to control the device 100, and a data storage unit 320 for storing various types of data generated while the device 100 operates. For example, the data storage unit 320 may store various types of content data of the device 100, and various types of data generated when a content preview function is executed.

The program storage unit 310 may include a position determining module 312, a preview content determining module 314, a scroll bar module 316, and a preview content editing module 318.

Referring to FIG. 1, the position determining module 312 may be used to determine a position of a suspension input point 13 of a generated suspension event. For example, when the input device approaches the screen so as to generate the suspension event, the position determining module 312 may detect a coordinates value of the suspension input point 13 (e.g., a touch end, a pointer, a luminous point, etc. of the input device which correspond to suspension displayed by the display module 102) on the screen, according to an output from the second touch module 106, so that whether a position of the suspension input point 13 on the screen is on the scroll bar 10 may be determined.

For example, when the suspension input point 13 is on the scroll bar 10, a response may be generated by using "On Hover Listener" on the scroll bar 10. Furthermore, when "On Hover function" of "On Hover Listener" is called, each of a suspension status, a suspension motion status, and an end of the suspension status on the scroll bar 10 may be processed.

When the suspension input point 13 is on the scroll bar 10, the preview content determining module 314 may determine preview content corresponding to the suspension input point 13, according to an output from the position determining module 312. That is, the preview content determining module 314 may determine the preview content according to the coordinates value of the suspension input point 13 on the scroll bar 10 or may determine preview content according to a position percentage of a position of the suspension input point 13 with respect to the scroll bar 10.

In more detail, when complete content information cannot be displayed via a signal page in an area of the main window with a current resolution of the device 100, or according to a size (a length, a width) of current content information, the scroll bar module 316 may dispose the scroll bar 10 on a preset area (e.g., a right side or a lower side) of the main window, so as to realize paged browsing of a view. The scroll bar 10 may be disposed with the slider 12 that is slidable along the scroll bar 10, and thus may realize a cross-page display with respect to content information of the main window. A size (length) of the slider 12 may be related to a size (a length and/or a width) of a content page displayed on the main window, and the length of the slider 12 may be decreased since the amount of the content information displayed on the main window is increased (or since a size of a page of the content information is increased). When resolutions are the same or sizes of pages of the content information are the same, the smaller the length of the slider 12 is, the more the pages of the content information displayed on the main window.

The position determining module 312 may determine a position of the slider 12. In this regard, the position determining module 312 may determine the position of the slider 12 by detecting coordinates values (X, Y) of a top end and a bottom end of the slider 12. In this case, the position of the slider 12 may be a position of the top end or a position of the bottom end of the slider 12. According to the position of the slider 12 detected by the position determining module 312, the display module 102 may display a page that corresponds to the position of the slider 12 in the main window.

When the position of the suspension input point 13 detected by the position determining module 312 is on the scroll bar 10, the preview content determining module 314 may determine the page of the content information corresponding to the suspension input point 13, according to coordinate values of a top end and a bottom end of the scroll bar 10 (or the length of the scroll bar 10), the coordinate values of the top end and the bottom end of the slider 12 (or the length of the slider 12), or a coordinate value of the suspension input point 13. That is, the preview content determining module 314 may determine content information of a random point on the scroll bar 10, according to relations between the length (or coordinate values) of the scroll bar 10, the length (or coordinate values) of the slider 12 and the page of the content information. In other words, after the scroll bar module 316 disposes the scroll bar 10, the coordinate values or respective position percentages of respective points on the scroll bar 10 may sequentially correspond to the pages of the content information on the main window of the device 100.

After the scroll bar module 316 disposes the scroll bar 10, the coordinate values (or a length value) of the scroll bar 10, a length value (or the coordinate values of the top end and the bottom end) of the slider 12, the pages of the content information, relations between the coordinate values, or the respective position percentages of the respective points on the scroll bar 10 may be stored in the data storage unit 320 in real-time. Therefore, the display module 102 may read corresponding data from the data storage unit 320 and may perform the display.

A preview page may be edited. In this regard, an edit operation may include at least one of inputting various types of information such as characters, clicking a view, turning pages of preview contents in a sliding manner (up-to-down sliding or left-to-right sliding), switching the preview content in a sub-window to the main window, and adjusting a size of the sub-window. When the edit operation with respect to the sub-window and the main window is performed, a user may first fix the sub-window to the main window via a preset operation. Since the sub-window is fixed, and the size of the sub-window is adjusted, the user may conveniently determine various types of content information by using two windows (the sub-window and the main window).

In the present exemplary embodiment, the position percentages may be displayed on the slider 12 of the scroll bar 10 or the suspension input point 13, so that the position percentages may indicate a percentage of a distance between a start position of the scroll bar 10 and a current position of the slider 12 or a percentage of the suspension input point 13 to a size of an entire content information page. That is, the position percentage may indicate a ratio of a distance between the top end of the scroll bar 10 and the slider 12 or a ratio of the suspension input point 13 to the overall length of the scroll bar 10. For example, as illustrated in FIG. 1, a percentage of 45% may be displayed on the slider 12 so as to indicate that the distance between the top end of the scroll bar 10 and the position of the slider 12 is 45% of the size (the height) of the entire content information page, and a position percentage of 80% displayed on the suspension input point 13 may indicate that a distance between the top end of the scroll bar 10 and the suspension input point 13 is 80% of the size (the height) of the entire content information.

In the present exemplary embodiment, when the suspension input point 13 on the scroll bar 10 is clicked, the slider 12 on the scroll bar 10 may be directly moved to the position of the suspension input point 13, so that the content information displayed on the main window may be paged to preview content in the sub-window. In more detail, when the slider 12 on the scroll bar 10 is moved to the position of the suspension input point 13, the position determining module 312 detects a coordinate value (X, Y) or a position percentage of the slider 12, thus, the display module 102 may read related data from the data storage unit 320 and may perform the display.

After the content preview function of the device 100 is activated, when the preview content determining module 314 determines content information corresponding to the suspension input point 13, the display module 102 may display content in the vicinity of the suspension input point 13 via the sub-window 14 (or a floating window). When the suspension input point 13 moves (i.e., suspension moving) on the scroll bar 10, a change in the coordinates of the suspension input point 13 is detected by the position determining module 312, and the preview content displayed on the sub-window 14 is changed accordingly, so that the user may conveniently search for user-desired content.

Furthermore, when the second touch module 106 detects disappearance of the suspension event on the scroll bar 10 or detects a preset input operation (e.g., during a suspension state, the input device moves in an opposite direction of the sub-window 14), a display of the sub-window 14 may be canceled.

The sub-window 14 may display the preview content via scrolling, and the amount of the content information included in the preview content may be equal to the amount of the content information currently displayed on the main window. However, the inventive concept is not limited thereto. The sub-window 14 may include a certain amount of content information with different resolutions which is greater or less than the amount of the content information of the main window. In addition, a size of the sub-window 14 may be manually or automatically adjusted.

After the sub-window 14 is displayed on the main window, in order to perform various edit operations with respect to the sub-window 14 and the preview content according to a user input, the preview content editing module 318 may fix the sub-window 14 to the screen, according to a preset motion by the user (e.g., during the suspension state, the input device moves in an opposite direction of the sub-window 14).

For example, referring to FIG. 1, while the sub-window 14 is displayed on the main window 5, when the second touch module 106 determines that the input device in the suspension state slides to the left side, the preview content editing module 318 may determine that the user needs to edit the preview content on the sub-window 14, and thus may fix the sub-window 14 to the main window 5. Therefore, the user may perform various editing operations on the preview content displayed on the sub-window 14 by using the preview content editing module 318. For example, in order to improve efficiency of the device 100 by using the two windows, the user may simultaneously input various data (for example, various types of authentication information in Internet) by using the main window 5 and the sub-window 14.

Referring to FIG. 1, for example, when the second touch module 106 determines that the input device in the suspension state slides to the right side, the controller 170 may determine that the user needs to cancel the sub-window 14, thus, the display unit 110 may cancel the display of the sub-window 14.

The communication unit 130 may perform a communication function for voice communication and data communication of the device 100. In this case, the communication unit 130 may be classified as a plurality of communication modules of various communication networks that are different from each other. For example, a Global System for Mobile communication (GSM) module, a Code division multiple access (CDMA) module, a Wideband Code Division Multiple Access (WCDMA) module, a Long-Term Evolution (LTE) module, an Orthogonal Frequency-Division Multiple Access (OFDMA) module, a Local Area Network (LAN) module, a Bluetooth module, and a Near field communication (NFC) module, or the like may be included.

In order to update the content information currently displayed on the main window, when the communication unit 130 receives new data, the scroll bar module 316 may adjust the position and length of the slider 12 while relations between respective points and pages of content information are updated and the updated relations are stored in the data storage unit 320. Accordingly, the display module 102 may display current content information.

The sub-window 14 and the main window 5 may use same application modules, so as to realize real-time updating and sharing with respect to data by setting link functions. That is, the sub-window 14 may be used as a shortcut for promptly accessing the preview content.

In order to control actions, the device 100 may execute respective programs stored in the program storage unit 310. The controller 170 may control the device 100 to provide the content preview function, by using at least one function unit (a program) stored in the storage 300. The controller 170 may further include a content preview processor (not shown) to perform the content preview function. That is, the content preview function in the present exemplary embodiment may be realized by using software such as the program stored in the storage 300 or by using hardware such as the content preview processor.

Figure 9:
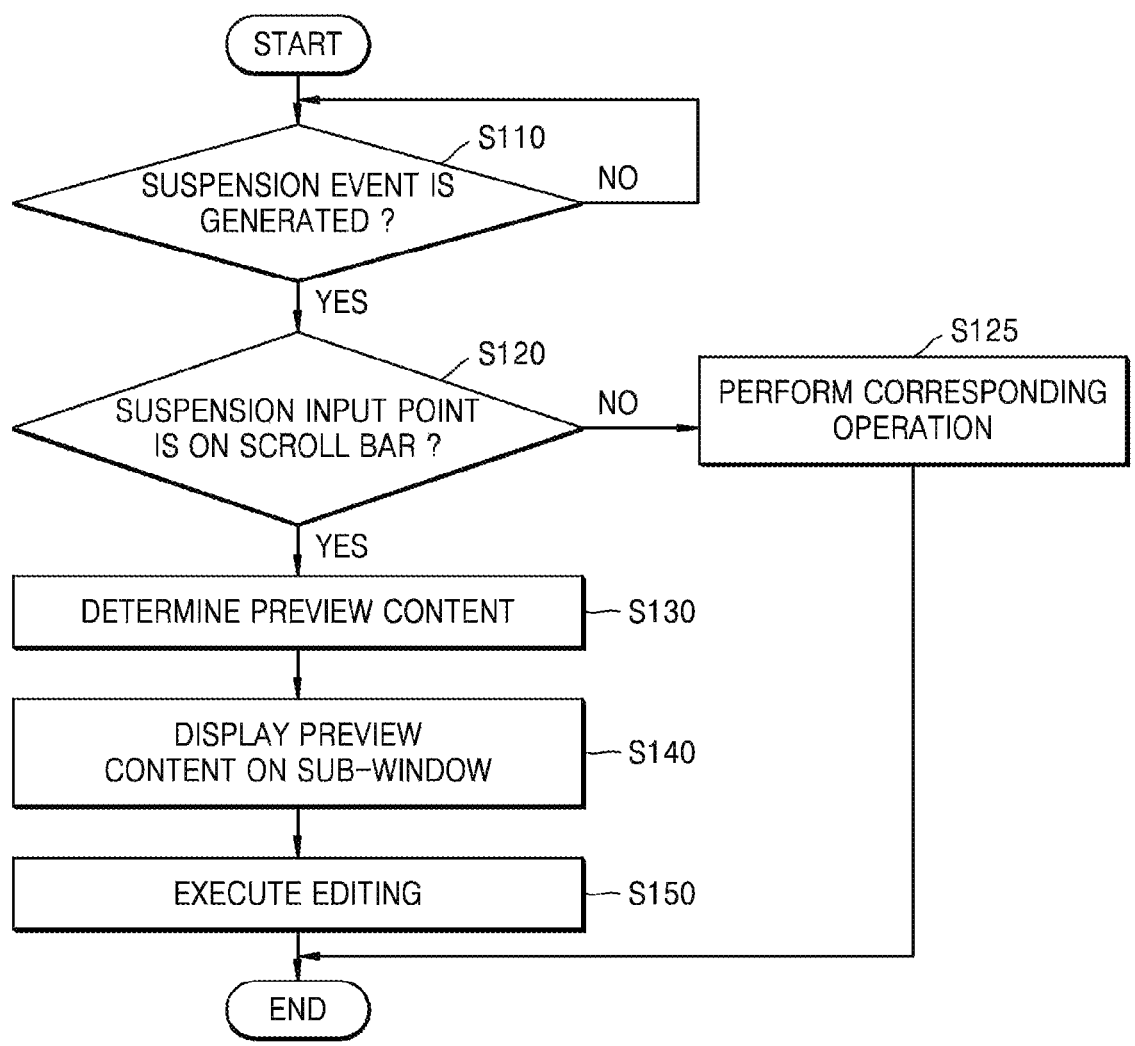
FIG. 9 is a flowchart related to a processor in the device which provides a content preview function, according to an exemplary embodiment.

FIG. 9 is a flowchart related to a processor in the device 100 which provides a content preview function, according to an exemplary embodiment.

In the present exemplary embodiment, after the content preview function of the device 100 is executed, when it is determined that content information cannot be completely displayed on one page of a main window, a scroll bar may be exposed at a preset position (generally at a right side and/or a left side) of a content information page, so as to realize browsing with respect to the content information.

In operation S110, the device 100 may detect whether a suspension event is generated. In this regard, the suspension event may mean that a distance between a touch end of an input device (a human body, a touch stylus, a handwriting stylus, etc.) of the device 100 and the device 100 is within a preset range (e.g., 5 mm, and in this regard, the range may be changed according to hardware configuration of the device 100). A suspension input point corresponding to the touch end may be displayed on a screen of the device 100.

Next, a result of operation S110 is executed. When the suspension event is detected, operation S110 may start, and whether a position of the suspension input point in the suspension event is on the scroll bar may be determined.

That is, in operation S110, the device 100 may determine whether the suspension input point is on the scroll bar and then may determine whether a user requests a content preview. In this regard, by detecting a coordinates value (X, Y) of the suspension input point, whether or not the coordinates value (X, Y) of the suspension input point is within a coordinates range of the scroll bar. If the coordinates value of the suspension input point is within the coordinates range of the scroll bar, the device 100 may determine that the user sent a content preview request. However, as a result of operation S120, if it is determined that the suspension input point is not on the scroll bar, in operation S125, other corresponding options may be executed.

When it is determined that the suspension input point is on the scroll bar, operation S130 starts, and when the suspension input point is on the scroll bar, preview content that corresponds to the suspension input point is determined. In this case, the preview content is determined according to the coordinates value (X, Y) of the suspension input point on the scroll bar or according to a position percentage of a position of the suspension input point with respect to the scroll bar. In this regard, the position percentage of the position of the suspension input point with respect to the scroll bar may indicate a ratio of a length between a start point of the content information on the scroll bar and the position of the suspension input point to an overall length of the scroll bar.

After the preview content related to the suspension input point is determined in operation S130, operation S140 starts and then the preview content may be displayed on a sub-window. In this regard, the amount of information of the preview content displayed on the sub-window may be equal to the amount of information of content displayed on a main window. That is, the sub-window may completely display the preview content. For example, if the main window may display ten communication histories with current resolution, a scaling manner of the sub-window may also display ten communication histories. However, the present exemplary embodiment is not limited hereto, and the amount of information on the sub-window may be different from the amount of information on the main window.

On the other hand, in operation S140, if the position of the suspension input point on the scroll bar is changed (e.g., suspension movement), the preview content on the sub-window may be changed in correspondence with the change in the position. The present exemplary embodiment may further operation S150 of editing the preview content. In more detail, in operation S150, it may be determined that the user sent an editing request, based on a recognized preset input operation (such as sliding toward the sub-window side in a suspension state), thus, the sub-window may be fixed to a current position of the main window. Afterward, various editing operations may be performed on the sub-window and the preview content, based on recognized input operations. In this case, editing may include at least one of inputting various types of information such as characters, clicking a view, turning pages of preview contents in a sliding manner (up-to-down sliding or left-to-right sliding), switching the preview content in the sub-window to the main window, and adjusting a size of the sub-window. Accordingly, the user may rapidly search for information due to cooperation of the main window and the sub-window, and the efficiency of inputting and editing the information may be improved, so that user experience may be improved. For example, according to the related art, when a user opens a contact list so as to search for a contact, the user may promptly search the contact list by using an index character. However, when there are too many contacts that can be accessed by using the index character, the user still has to slide a screen, which may cause problems of click errors and low efficiency. However, according to the present exemplary embodiment, after the user searches the contact list by using the index character, the user may not need to slide the screen upward or downward, and may rapidly preview a candidate contact list of other pages by suspending the input device on the displayed or hidden scroll bar and moving the input device on the scroll bar. When a desired contact list is found, the user may fix the sub-window to the main window and then may directly enter a particular page of a contact item via the sub-window. Accordingly, a contact list search speed may be obviously improved.

In addition, for example, according to the related art, when the user executes registration or authentication via the device 100, if some necessary information is not input, the user may slide the screen so as to search for uncompleted information, may input information, and then may proceed to a next stage. However, according to the present exemplary embodiment, when some necessary information remains uncompleted, the user may suspend the input device on the displayed or hidden scroll bar and may move the input device on the scroll bar, so that the user may determine a position of the uncompleted information via the sub-window without sliding the screen.

Furthermore, when the uncompleted information is found, the user may fix the sub-window to the main window and then may directly input information, and after the user inputs the information, the user may rapidly search for a confirm button via the sub-window so as to enter a next stage via operations in the sub-window.

After operation S140, when it is determined that the suspension input point is moved away from the scroll bar (i.e., the position of the suspension input point is not within a range of the scroll bar), the suspension event on the scroll bar disappears, and when a preset input operation (e.g., in a suspension state, sliding in an opposite direction of the sub-window) of the input device is detected, it may be determined that the user sent a request for canceling the sub-window, so that a display of the sub-window may be canceled.

Figure 10:
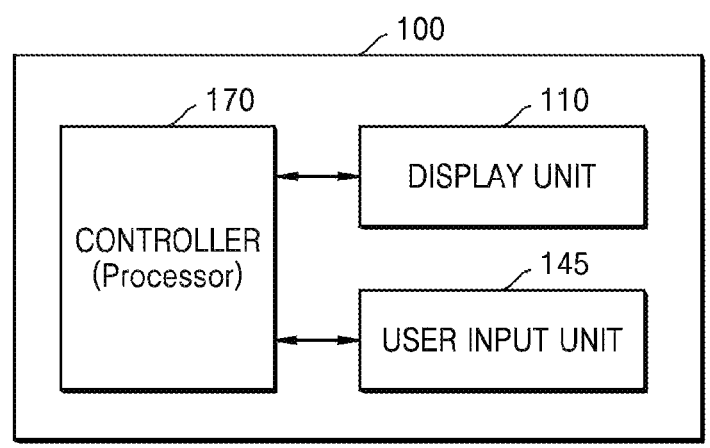
FIG. 10 is a block diagram illustrating a configuration of the device, according to an exemplary embodiment.

FIG. 10 is a block diagram illustrating a configuration of the device 100, according to an exemplary embodiment.

Referring to FIG. 10, the device 100 may include the controller 170 (also referred to as the processor 170), the display unit 110, and the user input unit 145.

The display unit 110 may display a main window for displaying an image on a screen of the device 100. When a size of the image is greater than a size of the main window, the display unit 110 may display, on the main window, a first partial image of the image and the scroll bar 10 for selecting an area to be displayed on the main window.

The image may include at least one of an item list, a webpage, and an electronic document.

The display unit 110 may display a marker on a first point 13 of the scroll bar 10, wherein the marker indicates a position selected according to a user input for selecting the first point 13 on the scroll bar 10.

The user input unit 145 may receive the user input for selecting the first point 13 on the scroll bar 10. The user input for selecting the first point 13 on the scroll bar 10 may include at least one of a proximate touch input and a mouse-over input.

When the user input for selecting the first point 13 on the scroll bar 10 is received, the controller 170 may control the display unit 110 to display a sub-window on the main window whereon the first partial image is displayed, wherein the sub-window displays a second partial image of the image which corresponds to the first point 13 on the scroll bar 10.

The scroll bar 10 may include a slider indicating a position of the first partial image in the image. The user input unit 145 may receive a second user input for selecting the slider and moving the selected slider on the scroll bar 10, and since the slider is moved on the scroll bar 10, the controller 170 may control the display unit 110 to change the area of the image which is displayed on the main window.

The controller 170 may control the display unit 110 to delete the sub-window after the sub-window is displayed and then a preset time period elapses.

The second partial image of the image may include a user interface object, and the user input unit 145 may receive a user input for selecting the user interface object on the sub-window.

The controller 170 may execute a function corresponding to the user interface object, based on the selected user interface object.

The user input unit 145 may receive a user input for selecting the sub-window, and when the sub-window is selected, the controller 170 may control the display unit 110 to delete the sub-window and to display the second partial image on the main window, wherein the second partial image has been displayed on the sub-window.

The user input unit 145 may receive a user input for selecting an item in the sub-window, and when the item in the sub-window is selected, the controller 170 may control the display unit 110 to delete the sub-window and to display detail information about the item on the main window.

The user input unit 145 may receive a user input for changing the sub-window to the main window, and when the user input for changing the sub-window to the main window is received, the controller 170 may control the display unit 110 to change the main window to a first main window, to change the sub-window to a second main window, and to display both the first main window and the second main window.

Figure 11:
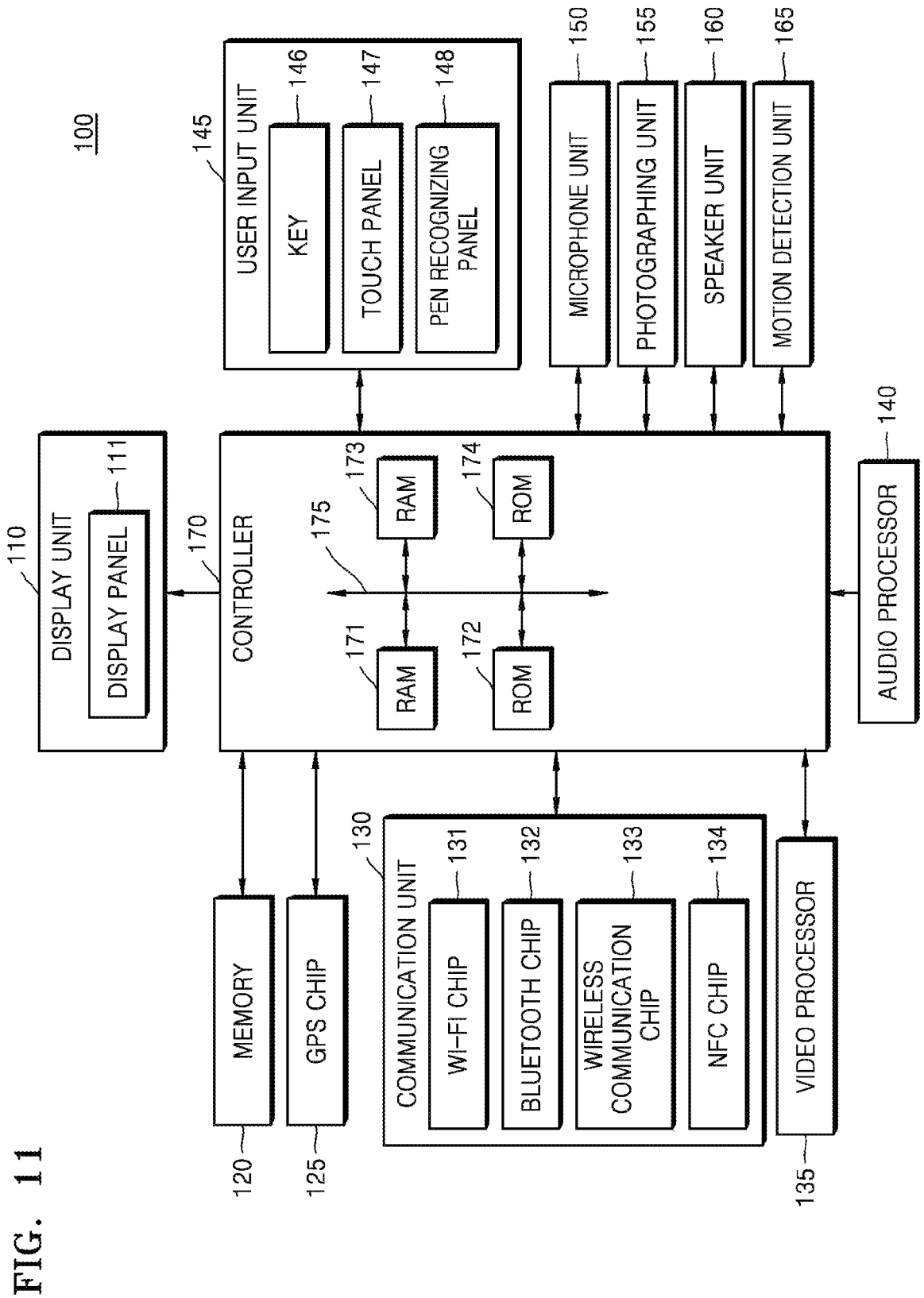
FIG. 11 is a block diagram illustrating a configuration of the device, according to another exemplary embodiment.

FIG. 11 is a block diagram illustrating a configuration of the device 100, according to another exemplary embodiment.

As illustrated in FIG. 11, the configuration of the device 100 may be applied to various types of a device such as a mobile phone, a tablet personal computer (PC), a personal digital assistant (PDA), an MP3 player, a kiosk, an electronic photoframe, a navigation device, a digital television (TV), a smart watch, a wristwatch, or a wearable device such as smart glasses, head-mounted display (HMD), or the like.

Referring to FIG. 11, the device 100 may include the controller 170, the display unit 110, and the user input unit 145 of FIG. 10, and may further include at least one of a memory 120, a global positioning system (GPS) chip 125, the communication unit 130, a video processor 135, an audio processor 140, a microphone unit 150, an image-capturing unit 155, a speaker unit 160, and a motion detecting unit 165.

The display unit 110 may include a display panel 111 and a controller (not shown) that controls the display panel 111. The display panel 111 may be embodied as various displays including a liquid crystal display (LCD) display, an organic light-emitting diode (OLED) display, an active matrix OLED (AMOLED) display, a plasma display panel (PDP), or the like. The display panel 111 may be formed to be flexible, transparent, and/or wearable. The display panel 111 may be combined with a touch panel 147 of the user input unit 145, and thus may be provided as a touchscreen (not shown). For example, the touchscreen may include an integrated module having a stack structure containing the display panel 111 and the touch panel 147.

The memory 120 may include at least one of an internal memory (not shown) and an external memory (not shown).

The internal memory may include at least one of a volatile memory (e.g., a dynamic random-access memory (DRAM), a static RAM (SRAM), a synchronous dynamic RAM (SDRAM), etc.), a non-volatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, etc.), a hard disk drive (HDD), and a solid-state drive (SSD). According to the present exemplary embodiment, the controller 170 may load a command or data, which is received from at least one of the non-volatile memory and another element, to the volatile memory, and may process the command or the data. Also, the controller 170 may store, in the non-volatile memory, data that is received from or is generated by another element.

The external memory may include at least one of a compact flash (CF) memory, a secure digital (SD) memory, a micro secure digital (micro-SD) memory, a mini secure digital (mini-SD) memory, an extreme digital (xD) memory, and a memory stick.

The memory 120 may store various programs and data used in operations of the device 100. For example, the memory 120 may temporarily or semi-permanently store a portion of contents to be displayed on a lock screen.

The controller 170 may control the display unit 110 to display a portion of contents which is stored in the memory 120. In other words, the controller 170 may display, on the display unit 110, the portion of the contents which is stored in the memory 120. Alternatively, when a user's gesture is performed in a region of the display unit 110, the controller 170 may perform a control operation that corresponds to the user's gesture.

The controller 170 may include at least one of a Random Access Memory (RAM) 171, a read-only memory (ROM) 172, a central processing unit (CPU) 173, a Graphics Processing Unit (GPU) 174, and a bus 175. The RAM 171, the ROM 172, the CPU 173, and the GPU 174 may be connected to each other via the bus 175.

The CPU 173 accesses the memory 120, and performs a booting operation by using an operating system (O/S) stored in the memory 120. Also, the CPU 173 performs various operations by using the various programs, a plurality of contents, a plurality of pieces of data, etc. which are stored in the memory 120.

The ROM 172 stores a command set for booting up a system. For example, when a turn-on command is input to the device 100, and power is supplied to the device 100, the CPU 173 may copy the operating system stored in the memory 120 to the RAM 171, according to the command stored in the ROM 172, may execute the operating system, and thus may boot up the system. When the booting operation is completed, the CPU 173 copies the various programs stored in the memory 120 to the RAM 171, and performs the various operations by executing the programs copied to the RAM 171. When the device 100 is booted up, the GPU 174 displays a user interface screen in a region of the display unit 110. In more detail, the GPU 174 may generate a screen that displays an electronic document including various objects such as content, an icon, a menu, or the like. The GPU 174 calculates coordinate values of the objects that are to be displayed according to a layout of the user interface screen, and calculates attribute values of shapes, sizes, or colors of the objects. Then, the GPU 174 may generate user interface screens with various layouts including the objects based on the calculated attribute values. The user interface screen generated by the GPU 174 may be provided to the display unit 110 and thus may be displayed in areas of the display unit 110.

The GPS chip 125 may receive a GPS signal from a GPS satellite and may calculate a current position of the device 100. In a case where a navigation program is used or a current position of the user is required, the controller 170 may calculate a position of the user by using the GPS chip 125.

The communication unit 130 may perform communication with various external devices according to various types of communication methods. The communication unit 130 may include at least one selected from a Wi-Fi chip 131, a Bluetooth chip 132, a wireless communication chip 133, and an NFC chip 134. The controller 170 may perform the communication with the various external devices by using the communication unit 130.

The Wi-Fi chip 131 and the Bluetooth chip 132 may perform communication by using WiFi and Bluetooth, respectively. If the Wi-Fi chip 131 or the Bluetooth chip 132 is used, the WiFi chip 131 or the Bluetooth chip 132 may first transmit and receive various types of connection information including a service set identification (SSID), a session key, or the like, may establish a connection for communication by using the connection information, and then may transmit and receive various types of information. The wireless communication chip 133 may indicate a chip that performs communication according to various communication standards such as the Institute of Electrical and Electronics Engineers (IEEE), ZigBee, $3^{rd}$ generation (3G), 3rd Generation Partnership Project (3GPP), LTE, or the like. The NFC chip 134 indicates a chip that operates in using NFC by using a 13.56 MHz band from among various radio frequency-identification (RF-ID) frequency bands such as 135 kHz, 13.56 MHz, 433 MHz, 860 through 960 MHz, 2.45 GHz, or the like.

The video processor 135 may process video data included in content received by using the communication unit 130 or may process video data included in content stored in the memory 120. The video processor 135 may perform various image processing such as decoding, scaling, noise filtering, frame rate conversion, resolution conversion, or the like on the video data.

The audio processor 140 may process audio data included in content received by using the communication unit 130 or may process audio data included in content stored in the memory 120. The audio processor 140 may perform various processing such as decoding, amplification, noise filtering, or the like on the audio data.

When a reproducing program for multimedia content is executed, the controller 170 may reproduce the multimedia content by driving the video processor 135 and the audio processor 140. The speaker unit 160 may output audio data generated in the audio processor 140.

The user input unit 145 may receive an input of various instructions from a user. The user input unit 145 may include at least one of a key 146, a touch panel 147, and a pen recognizing panel 148.

The key 146 may be of various types such as a mechanical button, a wheel, or the like that may be formed in a front portion, a side portion, a rear portion, etc., of an external surface of a body of the device 100.

The touch panel 147 may sense a touch input by the user and may output a value of a touch event that corresponds to a signal generated by the sensed touch input. When the touch panel 147 is combined with the display panel 111 and thus is formed as a touchscreen, the touchscreen may be configured as a capacitive touchscreen, a resistive touchscreen, or a piezoelectric touchscreen by using various types of touch sensors. The capacitive touchscreen may calculate touch coordinates by sensing a small amount of electricity generated when a body part of the user touches the surface of the capacitive touchscreen, which is coated with a dielectric material. The resistive touchscreen may include two embedded electrode plates and may calculate touch coordinates by sensing a flow of current that occurs when the user touches the resistive touchscreen which causes upper and lower plates of a touched point to contact each other. The touch event that occurs on the touchscreen may be mainly generated by a finger of a person but may also be generated by an object formed of a conductive material capable of changing capacitance.

The pen recognizing panel 148 may sense a proximity input or a touch input of a touch pen (e.g., a stylus pen or a digitizer pen) which is performed by a user, and may output a sensed pen proximity event or a sensed pen touch event. The pen recognizing panel 148 may be an electromagnetic resonance (EMR)-type pen recognizing panel, and may sense the touch input or the proximity input according to changes in a strength of an electromagnetic field, which occur when the touch pen approaches or touches the touchscreen. In more detail, the pen recognizing panel 148 may include an electromagnetic induction coil sensor (not shown) having a grid structure, and an electric signal processor (not shown) for sequentially providing an alternating current (AC) signal having a predetermined frequency to each loop coil of the electromagnetic induction coil sensor. When a pen having an internal resonance circuit is positioned near a loop coil of the pen recognizing panel 148, a magnetic field transmitted from the loop coil generates a current in the resonance circuit in the pen, based on mutual electrostatic induction. Due to the current, an induction field is generated from a coil forming the resonance circuit in the pen, and the pen recognizing panel 148 detects the induction field from the loop coil capable of receiving a signal, and thus senses the touch input or the proximity input by the pen. The pen recognizing panel 148 may be arranged to occupy a preset area below the display panel 111, e.g., may have a size capable of covering a display region of the display panel 111.

The microphone unit 150 may receive an input of a user's voice or other sound and may convert the user's voice or other sound to audio data. The controller 170 may use the user's voice, which is input via the microphone unit 150, in a call-related operation or may convert the user's voice to the audio data and may store the audio data in the memory 120.

The image-capturing unit 155 may capture a still image or a moving picture according to a control by the user. The image-capturing unit 155 may be plural in number and include a front camera, a rear camera, or the like.

If the image-capturing unit 155 and the microphone unit 150 are formed, the controller 170 may perform a control operation according to a user's voice input via the microphone unit 150 or a user's motion recognized by the image-capturing unit 155. For example, the device 100 may operate in a motion control mode or a voice control mode. If the device 100 operates in the motion control mode, the controller 170 may activate the image-capturing unit 155 and may capture an image of the user, may trace a change in motions of the user, and may perform a control operation corresponding thereto. If the device 100 operates in the voice control mode (i.e., a voice recognition mode), the controller 170 may analyze a user's voice input via the microphone unit 150, and may perform a control operation according to the analyzed user's voice.

The motion detecting unit 165 may detect movement of a body of the device 100. The device 100 may rotate or may tilt in various directions. Here, the motion detecting unit 165 may detect a movement characteristic such as a rotation direction, a rotation angle, a tilted angle, or the like by using at least one of various sensors including a magnetic sensor, a gyroscope sensor, an acceleration sensor, etc.

Although not illustrated in FIG. 11, the present exemplary embodiment may further include a universal serial bus (USB) port for connecting the device 100 and a USB connector, various external input ports including a headset, a mouse, a LAN, etc. for connection with various external terminals, a digital multimedia broadcasting (DMB) chip for receiving and processing a DMB signal, various sensors, or the like.

Names of the elements of the device 100 may be changed. Also, the device 100 according to the present exemplary embodiment may be embodied by including at least one of the elements, or may be embodied with more or less elements than the elements.

The one or more exemplary embodiments may be embodied as computer readable code/instructions on a recording medium, e.g., a program module to be executed in computers, which include computer-readable commands. The computer storage medium may include any usable medium that may be accessed by computers, volatile and non-volatile medium, and detachable and non-detachable medium. Also, the computer storage medium may include a computer storage medium and a communication medium. The computer storage medium includes all volatile and non-volatile media, and detachable and non-detachable media which are technically implemented to store information including computer readable commands, data structures, program modules or other data. The communication medium includes computer-readable commands, a data structure, a program module, other data as modulation-type data signals such as carrier signals, or other transmission mechanism, and includes other information transmission mediums.

In addition, instructions on the recording medium may be read by the device 100. The instructions that are read by the device 100 may be loaded in the memory 120 of the device 100 and may be executed by the controller 170, so that the one or more exemplary embodiments may be performed by the device 100.

Throughout the specification, the term "unit" may indicate a hardware component such as a processor or a circuit, and/or may indicate a software component that is executed by a hardware configuration such as a processor.

It should be understood that the exemplary embodiments described herein should be considered in a descriptive sense only and not for purposes of limitation. Descriptions of features or aspects within each embodiment should typically be considered as available for other similar features or aspects in other embodiments. For example, configuring elements that are singular forms may be executed in a distributed fashion, and also, configuring elements that are distributed may be combined and then executed.

While one or more exemplary embodiments have been described with reference to the figures, it will be understood by those of ordinary skill in the art that various changes in form and details may be made therein without departing from the spirit and scope as defined by the following claims.

What is claimed is:

1. An apparatus for displaying an image, the apparatus comprising:
 a display; and
 at least one processor configured to:
  control the display to display a main window for displaying an image on a screen of the apparatus, and to display, on the main window, a user interface for obtaining an input for selecting an area of the image to be displayed on the main window and a first image of the image selected via the user interface,
  based on a first user input for selecting a point on the user interface being obtained, control the display to display a second image of the image which corresponds to the selected point on the user interface, on an area of the main window on which the first image is displayed,
  based on a second user input for displaying the second image to the main window being obtained, control the display to change the main window, on which the first image and the second image are display, into a first main window for displaying the first image and a second main window for displaying the second image, and then to display both the first main window on which the first image is displayed and the second main window on which the second image is displayed,
 wherein the second image comprises a user interface object, the at least one processor is further configured to obtain a third user input for selecting the user interface object on the second image, and execute a function corresponding to the user interface object, based on the user interface object,
 wherein the first user input, the second user input, and the third user input are separate inputs, and
 wherein the at least one processor is further configured to:
 based on identifying that a size of the first image is greater than a size of the first main window, control the display to display a first user interface for indicating a position of the first image of the image next to the first image on the first main window, and
 based on identifying that a size of the second image is greater than a size of the second main window, control the display to display a second user interface for indicating a position of the second image of the image next to the second image on the second main window.

2. The apparatus of claim 1, wherein, when the first user input for selecting the point on the user interface is no longer obtained while the second image is displayed, the at least one processor is further configured to control the display not to display the second image.

3. The apparatus of claim 1, wherein
 the at least one processor is further configured to obtain a fourth user input for fixing the second image to the area of the main window, and
 the at least one processor is further configured to control, when the fourth user input for fixing the second image to the area of the main window is obtained, the display to continuously display the second image that is displayed on the area of the main window when the fourth user input for fixing the second image to the area of the main window is obtained.

4. The apparatus of claim 1, wherein
 the at least one processor is further configured to obtain a fourth user input for selecting the second image; and
 the at least one processor is further configured to control, when the second image is selected, the display to delete the second image and then to display the second image on the main window on which the first image is displayed, wherein the second image has been displayed on the area of the main window.

5. The apparatus of claim 1, wherein the at least one processor is further configured to control the display to display a marker, which indicates the selected point, on the selected point.

6. The apparatus of claim 1, wherein the first user input for selecting the point on the user interface comprises at least one of a proximate touch input and a mouse-over input.

7. The apparatus of claim 1, wherein the user interface comprises a slider for indicating, in the image, a position of the first image,
 the at least one processor is further configured to obtain a fourth user input for selecting the slider and moving the slider on the user interface, and
 when the slider is moved on the user interface, the at least one processor is further configured to control, the display to change the area of the image which is displayed on the main window.

8. The apparatus of claim 1, wherein the image comprises at least one of an item list, a webpage, and an electronic document.

9. A method of displaying an image that is implemented by at least one processor, the method comprising:
 displaying a main window for displaying an image on a screen of an apparatus;
 displaying, on the main window, a user interface for obtaining an input for selecting an area of the image to be displayed on the main window and a first image of the image selected via the user interface;
 based on a first user input for selecting a point on the user interface being obtained, displaying a second image of the image which corresponds to the selected point on the user interface, on an area of the main window on which the first image is displayed;
 based on a second user input for displaying the second image to the main window being obtained, changing the main window, on which the first image and the second image are displayed, into a first main window for displaying the first image and a second main window for displaying the second image, and then displaying both the first main window on which the first image is displayed, and the second main window on which the second image is displayed, wherein the second image comprises a user interface object;
 obtaining a third user input for selecting the user interface object on the second image; and
 executing a function corresponding to the user interface object, based on the user interface object,
 wherein the first user input, the second user input, and the third user input are separate inputs, and
 wherein the method further comprises:
 based on identifying that a size of the first image is greater than a size of the first main window, displaying a first user interface for indicating a position of the first image of the image next to the first image on the first main window; and
 base on identifying that a size of the second image is greater than a size of the second main window, displaying a second user interface for indicating a position of the second image of the image next to the second image on the second main window.

10. The method of claim 9, further comprising not displaying of the second image, when the first user input for selecting the point on the user interface is no longer obtained while the second image is displayed.

11. The method of claim 9, further comprising:
obtaining a fourth user input for fixing the second image to the area of the main window; and
when the fourth user input for fixing the second image to the area of the main window is obtained, continuously displaying the second image that is displayed on the area of the main window when the fourth user input for fixing the second image to the area of the main window is obtained.

12. The method of claim 9, further comprising:
obtaining a fourth user input for selecting the second image; and
when the second image is selected, deleting the second image and then displaying the deleted second image on the main window on which the first image is displayed, wherein the second image has been displayed on the area of the main window.

13. The method of claim 9, further comprising displaying a marker, which indicates the selected point, on the selected point.

14. The method of claim 9, wherein the first user input for selecting the point on the user interface comprises at least one of a proximate touch input and a mouse-over input.

15. The method of claim 9, wherein the user interface comprises a slider for indicating, in the image, a position of the first image, and
the method further comprises:
obtaining a fourth user input for selecting the slider and moving the slider on the user interface; and
when the slider is moved on the user interface, changing the area of the image which is displayed on the main window.

16. The method of claim 9, wherein the image comprises at least one of an item list, a webpage, and an electronic document.

17. A non-transitory computer-readable recording medium having recorded thereon a program for executing the method of claim 9.

* * * * *